April 1, 1969 V. BAROUH 3,435,542
LANGUAGE AID SYSTEM
Filed Aug. 10, 1967
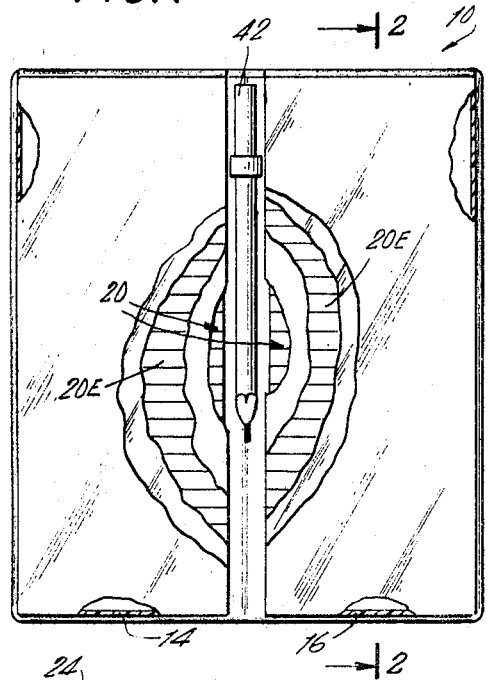
FIG. 1
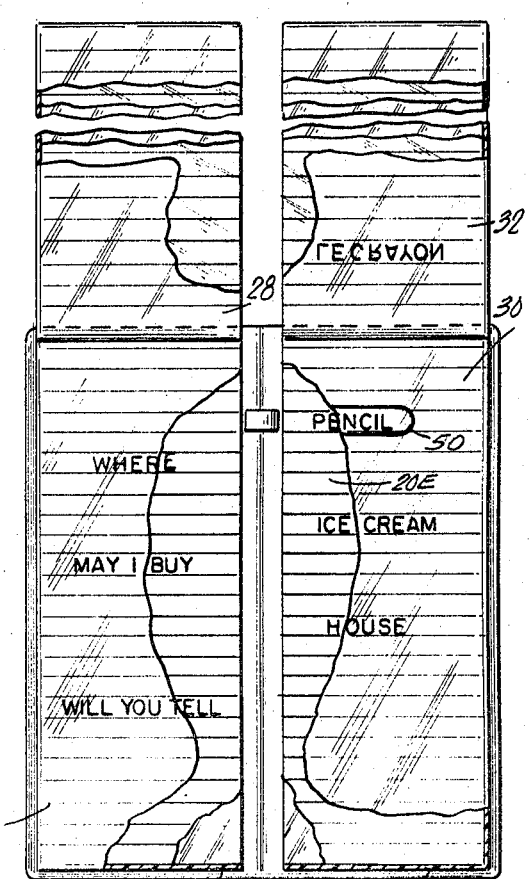
FIG. 3
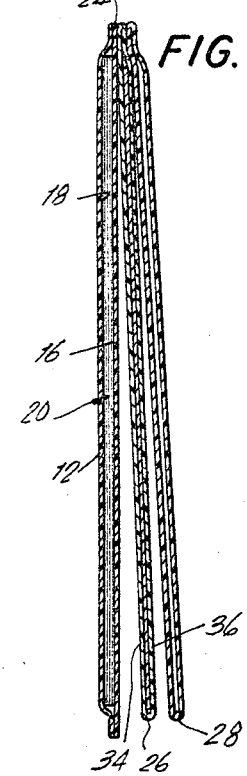
FIG. 2
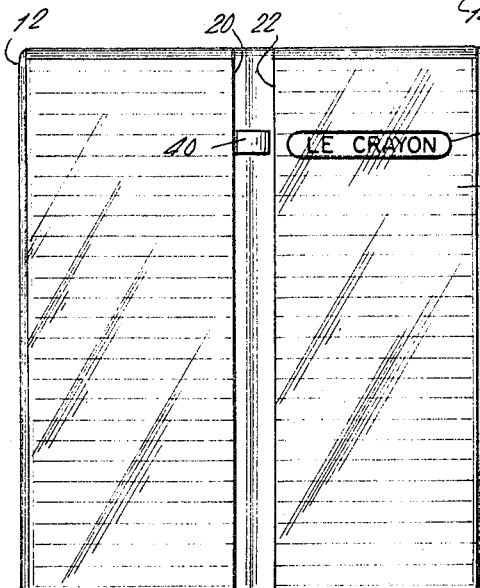
FIG. 4
FIG. 5
INVENTOR.
VICTOR BAROUH
Kenneth S. Goldfarb
ATTORNEYS United States Patent Office 3,435,542
Patented Apr. 1, 1969

3,435,542
LANGUAGE AID SYSTEM
Victor Barouh, 935 Plum Tree Road,
Westbury, N.Y. 11590
Filed Aug. 10, 1967, Ser. No. 659,670
Int. Cl. G09b *19/06;* B42d *1/00, 3/12*
U.S. Cl. 35—35                               6 Claims

ABSTRACT OF THE DISCLOSURE

A language aid device comprising a book-shaped cover capable of being opened to lie flat. Affixed to each side of the cover are a pair of rectangular sheets for forming pockets for receiving language aid cards formed of a translucent plastic material such as Mylar. Heat seamed with the sheet to the top edge of the cover are pairs of flaps of transparent material for receiving language aid cards therein for facilitating the registry of the language aid cards to enable translation of words. A marker is carried by the cover and is used for marking words and phrases for enabling a person knowing one language but wishing to speak in another language to form sentences in the unknown language.

---

This invention relates to a language aid system which will help people make themselves understood by people who cannot speak the same language.

Briefly, the concept of the invention resides in a book-type folder having a cover that opens substantially flat. Affixed to the cover are sheets forming pockets. Additionally, two pairs of flexible flaps of transparent plastic material such as Mylar or the like are heat sealed to the cover at the upper edges of the flaps and the cover overlies the pockets. Language aid cards of different languages are designed to be placed in the flaps from a selection of cards disposed in the pockets so that the user can employ a marker for facilitating translation of various preselected words and phrases from, for example English to another language such as French.

A further object of the invention resides in the provision of a language aid system adapted to be used by a person who speaks any one of a selected number of languages contained in the system who wishes to communicate with a person who understands another of the languages.

A special feature of the invention resides in the use of transparent Mylar for flaps which is capable of being conveniently cleaned yet on which a suitable marker may be used to provide indicia for translating words from one language to another and enables the showing of the desired words to a person knowing a different language for facilitating comunmication.

Still further objects and features of this invention reside in the provision of a language aid system employing a book-type device that is simple in construction, capable of being manufactured out of readily available and relatively inexpensive material, and which is light in weight, durable, and capable of being easily carried by a traveler or other person having the need for the device.

These, together with the various ancillary objects and features of the invention, which will become apparent as the following description proceeds, are attained by this language aid system, a preferred embodiment of which is illustrated in the accompanying drawing, by way of example only, wherein:

FIG. 1 is a plan view of the device shown in its open position, with parts thereof being broken away to show other parts in detail;

FIG. 2 is an enlarged vertical sectional view taken along the plane of line 2—2 in FIG. 1;

FIG. 3 is a view similar to FIG. 1 but shown with the upper flaps in a raised position;

FIG. 4 is a view similar to FIG. 1, but showing the language aid cards inserted in the flaps; and, FIG. 5 is an elevational view of the device in a closed position.

With continuing reference to the accompany drawing, wherein like reference numerals designate similar parts throughout the various views, reference numeral 10 is used to generally designate a language aid device constucted in accordance with the concepts of the present invention. The language aid device 10 includes a book-like cover 12 formed of a synthetic plastic material and which may be decorated, grained and colored, to suit the taste and fancy of the manufacturer and purchaser.

Bonded to the cover 12 are a pair of sheets 14, 16 which are heat sealed along three edges thereof so as to form a pair of pockets 18 opening as at 20 and 22.

The pockets are of a rectangular shape and are adapted each to receive a plurality of language cards generally indicated at 20 therein.

Heat sealed at the top edge 24 of the cover and along their top edges are pairs of flaps 26, 28 and 30, 32. The flaps are open at each of the sides thereof and each includes pairs of integrally united sheets 34, 36 formed of a suitable transparent plastic material such as Mylar or the like. The flaps are flexible and are adapted to be moved into a raised position as shown in FIG. 3 as may be found necessary. Bonded to the cover 12 on its inner surface along the fold line thereof between the flaps is a suitable retaining means in the form of a strap 40 for holding a crayon or suitable marking pencil of the type capable of writing on Mylar or other like transparent material. The markings may be easily erased by a tissue or even a finger of the user by merely rubbing off such markings on the flaps.

The language cards 20 are formed of a translucent Mylar printed in various languages such as English, Spanish, Italian, Russian, German and French. When, for example, it is desired to translate from English to French, the English language cards 20E are placed in each of the flaps 26 and 30. As can be seen best in FIG. 3, the left handed cards preferably have verbs and phrases of action-type words. The cards placed in the flap 30 are generally nouns, that is physical things or items. If, for example, it is desired to translate the word "pencil" into French, with the card 20E in place in the flap 30 using the marking crayon 42 the word "pencil" is encircled as at 50. Then, the flap 32 is placed in overlying position relative to the flap 30 and a circle corresponding to the marking 50 is made at 52. Insertion of the French language card 20F in the flap 28 overlying the English language cards 20E and in registry therewith will cause the words "le crayon" to appear, thus translating the word "pencil" to its French equivalent.

A latitude of modification, substitution and change is intended in the foregoing disclosure, and in some instances some features of the invention will be employed without a corresponding use of other features. The invention is suitable for use in hospitals, restaurants, commercially and for other like purposes. Accordingly, it is appropriate that the appended claims be construed broadly and in a manner consistent with the spirit and scope of the present invention.

I claim:
1. A language aid device comprising a cover having a center fold and capable of being opened to lie substantially flat, a pair of rectangular sheets affixed to said cover on three sides thereof to form a pair of pockets, two pairs of flexible flaps of transparent plastic material, each pair of flaps being affixed to said cover along one edge thereof and overlying one of said pockets with one of each of said pair of flaps directly overlying the other flap of each pair, a first pair of language cards containing printed words in a first known language disposed in the lowermost of said flaps of each pair of flaps, and a second pair of language cards containing printed words in a second unknown language and having the same meaning as the words on said first pair of cards, said second pair of cards being disposed in the uppermost of said flaps of each pair of flaps in registry with said first pair of cards.

2. A language aid device according to claim 1, wherein said sheet and said flaps are all heat sealed to said cover along the uppermost edges thereof.

3. A language aid device according to claim 2, wherein said cards are of translucent Mylar.

4. A language aid device according to claim 3, including means bonded to said cover between said pairs of flaps for receiving a marking device.

5. A language aid device according to claim 4, including pairs of language cards of different languages disposed in said pockets.

6. A language aid device according to claim 1, said cards being of translucent Mylar, and pairs of language cards of different languages being disposed in said pockets.

References Cited
UNITED STATES PATENTS

| | | | |
|---|---|---|---|
| 465,412 | 12/1891 | Miller | 281—17 |
| 1,041,703 | 10/1912 | Tirrill | 281—31 X |
| 2,385,452 | 9/1945 | Lande. | |
| 2,475,067 | 7/1949 | Wege | 281—17 |

WILLIAM H. GRIEB, *Primary Examiner.*

U.S. Cl. X.R.

281—16, 30